(12) United States Patent
Suzuki et al.

(10) Patent No.: US 11,594,883 B2
(45) Date of Patent: Feb. 28, 2023

(54) DIRECT CURRENT POWER SUPPLYING SYSTEM

(71) Applicant: TDK CORPORATION, Tokyo (JP)

(72) Inventors: Shingo Suzuki, Tokyo (JP); Katsuo Naoi, Tokyo (JP); Takuma Mitsunaga, Tokyo (JP)

(73) Assignee: TDK CORPORATION, Tokyo (JP)

( * ) Notice: Subject to any disclaimer, the term of this patent is extended or adjusted under 35 U.S.C. 154(b) by 130 days.

(21) Appl. No.: 16/961,036

(22) PCT Filed: Jan. 23, 2018

(86) PCT No.: PCT/JP2018/001973
§ 371 (c)(1),
(2) Date: Jul. 9, 2020

(87) PCT Pub. No.: WO2019/145997
PCT Pub. Date: Aug. 1, 2019

(65) Prior Publication Data
US 2021/0066929 A1 Mar. 4, 2021

(51) Int. Cl.
*H02J 7/00* (2006.01)
*H02J 3/38* (2006.01)
(Continued)

(52) U.S. Cl.
CPC .......... *H02J 1/102* (2013.01); *H02J 1/00* (2013.01); *H02J 3/38* (2013.01); *H02J 7/0018* (2013.01);
(Continued)

(58) Field of Classification Search
CPC ...... H02J 7/0018; H02J 1/102; H02J 7/00714; H02J 1/00; H02J 3/32; H02J 3/38
(Continued)

(56) References Cited

U.S. PATENT DOCUMENTS 6,172,480 B1 * 1/2001 Vandelac ............ H02J 7/00711
320/125
6,841,972 B2 * 1/2005 Koo .................... H02J 7/14
320/132
(Continued)

FOREIGN PATENT DOCUMENTS

CN   206790116 U   * 12/2017
EP      2985857        2/2016
(Continued)

OTHER PUBLICATIONS

Official Communication issued in International Bureau of WIPO Patent Application No. PCT/JP2018/001973, dated Feb. 20, 2018.
(Continued)

*Primary Examiner* — John T Trischler
(74) *Attorney, Agent, or Firm* — Greenblum & Bernstein, P.L.C.

(57) ABSTRACT

Fluctuations in the battery life of a plurality of storage batteries are reduced. A DC power supplying system includes power conditioners that supply generated power of power generators to a DC bus, converters that perform voltage conversion on a bus voltage and supply load power to load appliances, bidirectional converters that execute charging operations that charge storage batteries and discharging operations that discharge the storage batteries, and an energy management system that causes the converters to execute a charging operation when the generated power exceeds the load power and to execute a discharging operation when the generated power is below the load power. During a charging operation, the energy management system applies a first voltage-current characteristic that linearly increases the charging current in keeping with an increase in the bus voltage to each bidirectional DC/DC converter with a slope in keeping with the SOC of a storage battery.

2 Claims, 3 Drawing Sheets

(51) Int. Cl.
  *H02J 7/34* (2006.01)
  *H02J 1/10* (2006.01)
  *H02J 1/00* (2006.01)
  *H02J 9/06* (2006.01)

(52) U.S. Cl.
  CPC ............ *H02J 7/00714* (2020.01); *H02J 7/34* (2013.01); *H02J 9/061* (2013.01); *H02J 2207/20* (2020.01); *H02J 2300/22* (2020.01); *H02J 2300/24* (2020.01); *H02J 2300/28* (2020.01); *H02J 2300/30* (2020.01)

(58) Field of Classification Search
  USPC ......................................................... 320/136
  See application file for complete search history.

(56) References Cited

U.S. PATENT DOCUMENTS

| | | | | |
|---|---|---|---|---|
| 7,245,469 | B2* | 7/2007 | Nemoto | H02J 9/061 361/65 |
| 7,250,741 | B2* | 7/2007 | Koo | G01R 31/3842 320/132 |
| 7,705,574 | B2* | 4/2010 | Fox | G05F 1/569 323/268 |
| 8,442,698 | B2* | 5/2013 | Fahimi | H02J 3/32 700/297 |
| 8,456,878 | B2* | 6/2013 | Min | H02J 3/382 363/95 |
| 8,532,833 | B2* | 9/2013 | Kim | H02J 13/00034 700/286 |
| 8,552,590 | B2* | 10/2013 | Moon | H02J 3/386 307/64 |
| 8,558,510 | B2* | 10/2013 | Moon | H02J 7/00716 320/140 |
| 8,575,780 | B2* | 11/2013 | Moon | H02J 3/382 307/64 |
| 8,581,551 | B2* | 11/2013 | Seo | G06F 1/26 320/101 |
| 8,633,619 | B2* | 1/2014 | Robinson | H02J 7/0068 307/115 |
| 8,638,011 | B2* | 1/2014 | Robinson | H02J 1/00 307/115 |
| 8,676,276 | B2* | 3/2014 | Kim | H02J 7/35 320/110 |
| 8,716,891 | B2* | 5/2014 | Choi | H02J 9/062 307/71 |
| 8,716,892 | B2* | 5/2014 | Min | H02J 1/00 307/64 |
| 8,766,590 | B2* | 7/2014 | Lee | H02J 3/32 700/297 |
| 8,773,076 | B2* | 7/2014 | Choi | H02J 3/382 320/139 |
| 8,775,846 | B2* | 7/2014 | Robinson | G06F 1/3287 455/574 |
| 8,808,886 | B2* | 8/2014 | Kim | H02J 7/0016 338/68 |
| 8,810,066 | B2* | 8/2014 | Moon | H02J 3/32 307/65 |
| 8,810,203 | B2* | 8/2014 | Abe | H01M 10/425 320/132 |
| 8,837,182 | B2* | 9/2014 | Min | G05F 1/67 363/95 |
| 8,849,471 | B2* | 9/2014 | Daniel | G05F 1/66 703/2 |
| 8,854,004 | B2* | 10/2014 | Lee | H02J 3/385 320/101 |
| 8,860,252 | B2* | 10/2014 | Kang | H02J 3/32 307/46 |
| 8,872,380 | B2* | 10/2014 | Shim | H01M 10/486 307/64 |
| 8,928,176 | B2* | 1/2015 | Park | H02J 3/383 307/80 |
| 8,935,145 | B2* | 1/2015 | Yang | G06F 30/20 703/13 |
| 8,938,323 | B2* | 1/2015 | Lee | G06F 1/30 700/297 |
| 8,941,263 | B2* | 1/2015 | Lee | H02J 3/32 307/77 |
| 8,941,354 | B2* | 1/2015 | Song | H04Q 9/00 320/116 |
| 8,963,499 | B2* | 2/2015 | Choi | H02J 7/0016 320/122 |
| 8,970,176 | B2* | 3/2015 | Ballatine | H02J 3/383 307/18 |
| 8,976,034 | B2* | 3/2015 | Yoo | G01R 31/371 340/693.7 |
| 9,041,345 | B2* | 5/2015 | Choi | H02J 7/0016 320/152 |
| 9,041,354 | B2* | 5/2015 | Lee | H02J 7/35 320/140 |
| 9,065,296 | B2* | 6/2015 | Shim | H02J 7/0021 |
| 9,071,056 | B2* | 6/2015 | Yang | H02J 7/0016 |
| 9,088,164 | B2* | 7/2015 | Shim | H02J 7/0019 |
| 9,118,191 | B2* | 8/2015 | Jung | H02J 7/0016 |
| 9,153,967 | B2* | 10/2015 | Kim | H02J 3/386 |
| 9,153,976 | B2* | 10/2015 | Kim | H02J 7/007194 |
| 9,172,259 | B2* | 10/2015 | Hwang | H02J 7/0016 |
| 9,209,500 | B2* | 12/2015 | Kim | H01M 10/637 |
| 9,209,641 | B2* | 12/2015 | Jung | H02J 3/32 |
| 9,231,407 | B2* | 1/2016 | Shim | H02J 7/34 |
| 9,240,692 | B2* | 1/2016 | Song | H02J 7/007182 |
| 9,257,860 | B2* | 2/2016 | Kim | H02J 7/0068 |
| 9,263,776 | B2* | 2/2016 | Yun | H02J 7/0013 |
| 9,277,298 | B2* | 3/2016 | Yang | H04Q 9/00 |
| 9,293,923 | B2* | 3/2016 | Kim | H02J 9/062 |
| 9,300,016 | B2* | 3/2016 | Yun | H01M 10/482 |
| 9,306,409 | B2* | 4/2016 | Yoo | H02J 7/0022 |
| 9,356,323 | B2* | 5/2016 | Kim | H01M 10/443 |
| 9,362,750 | B2* | 6/2016 | Kang | H02J 7/34 |
| 9,395,417 | B2* | 7/2016 | Song | H02J 7/0013 |
| 9,401,616 | B2* | 7/2016 | Yun | H02J 7/0068 |
| 9,406,981 | B2* | 8/2016 | Kim | H01M 10/482 |
| 9,436,261 | B2* | 9/2016 | Yun | H02J 7/00047 |
| 9,444,267 | B2* | 9/2016 | Suzuki | H01M 10/482 |
| 9,455,578 | B2* | 9/2016 | Kim | H02J 7/0014 |
| 9,478,981 | B2* | 10/2016 | Jung | H02J 3/381 |
| 9,559,528 | B2* | 1/2017 | Kim | H02J 7/0016 |
| 9,599,675 | B2* | 3/2017 | Yun | G01R 31/367 |
| 9,627,720 | B2* | 4/2017 | Yun | G01K 13/00 |
| 9,627,904 | B2* | 4/2017 | Wang | H02J 7/00 |
| 9,634,491 | B2* | 4/2017 | Robinson | H02J 1/00 |
| 9,780,567 | B2* | 10/2017 | Hunt | H02J 3/26 |
| 9,865,901 | B2* | 1/2018 | Hwang | H02J 7/0014 |
| 9,893,550 | B2* | 2/2018 | Yoo | H02J 7/022 |
| 10,027,134 | B2* | 7/2018 | Mei | H02J 7/0021 |
| 10,279,699 | B2* | 5/2019 | Fink | B60W 10/26 |
| 10,284,009 | B2* | 5/2019 | Park | H02J 7/007 |
| 10,291,026 | B2* | 5/2019 | Hunt | H02J 7/007 |
| 10,298,006 | B2* | 5/2019 | Kim | H02J 7/0029 |
| 10,305,295 | B2* | 5/2019 | Kelly-Morgan | H02J 7/0045 |
| 10,333,315 | B2* | 6/2019 | Robinson | G06F 1/3287 |
| 10,347,952 | B2* | 7/2019 | Choi | G01R 19/16542 |
| 10,464,507 | B2* | 11/2019 | Yang | B63H 21/00 |
| 10,491,033 | B2* | 11/2019 | Wei | H02J 7/007 |
| 10,541,548 | B2* | 1/2020 | Kim | H02J 7/00308 |
| 10,566,802 | B2* | 2/2020 | Hunt | H02J 7/02 |
| 10,763,682 | B2* | 9/2020 | Kim | H02J 7/0013 |
| 10,811,900 | B2* | 10/2020 | Abe | H02M 7/219 |
| 10,868,477 | B2* | 12/2020 | Lee | H02M 7/5387 |
| 10,910,682 | B2* | 2/2021 | Morita | H01M 10/44 |
| 10,916,946 | B2* | 2/2021 | Park | B60L 53/22 |
| 10,958,086 | B2* | 3/2021 | Yang | G01R 31/36 |
| 11,043,902 | B2* | 6/2021 | Krzywinski | H02M 3/33584 |
| 11,063,447 | B2* | 7/2021 | Kim | H01M 10/44 |
| 11,095,131 | B2* | 8/2021 | Zhou | H02J 7/0047 |
| 11,158,888 | B2* | 10/2021 | Yamasaki | G01R 31/3842 |
| 11,239,519 | B2* | 2/2022 | Nishikawa | H02J 7/007 |
| 2001/0017243 | A1* | 8/2001 | Tajima | B66B 1/30 187/296 |

(56) References Cited

U.S. PATENT DOCUMENTS

| | | | |
|---|---|---|---|
| 2001/0048287 A1* | 12/2001 | Vandelac | H02J 7/00711 320/125 |
| 2003/0231009 A1* | 12/2003 | Nemoto | H02J 9/061 323/276 |
| 2004/0000892 A1* | 1/2004 | Jae-Seung | H02J 7/0063 320/132 |
| 2005/0035742 A1* | 2/2005 | Koo | H02J 7/0047 320/149 |
| 2006/0043938 A1* | 3/2006 | O'Gorman | H02P 9/105 322/8 |
| 2007/0120534 A1* | 5/2007 | Arai | G01R 31/389 320/133 |
| 2010/0198421 A1* | 8/2010 | Fahimi | H02J 3/32 700/291 |
| 2010/0210322 A1* | 8/2010 | Kim | H02J 7/35 455/574 |
| 2011/0006603 A1* | 1/2011 | Robinson | G06F 1/266 307/31 |
| 2011/0007491 A1* | 1/2011 | Robinson | H02J 7/0068 361/810 |
| 2011/0115295 A1* | 5/2011 | Moon | H02J 3/386 307/65 |
| 2011/0140520 A1* | 6/2011 | Lee | H02J 3/385 307/25 |
| 2011/0140648 A1* | 6/2011 | Lee | H02J 7/34 307/66 |
| 2011/0140667 A1* | 6/2011 | Moon | H02J 7/35 320/134 |
| 2011/0144822 A1* | 6/2011 | Choi | H02J 3/32 700/297 |
| 2011/0148195 A1* | 6/2011 | Lee | H02J 7/35 307/25 |
| 2011/0148205 A1* | 6/2011 | Moon | H02J 3/32 307/65 |
| 2011/0175451 A1* | 7/2011 | Moon | H02J 3/382 307/66 |
| 2011/0208370 A1* | 8/2011 | Lee | G06F 1/30 700/297 |
| 2011/0210614 A1* | 9/2011 | Min | H02J 9/062 307/82 |
| 2011/0215649 A1* | 9/2011 | Min | H02J 1/00 307/72 |
| 2011/0291479 A1* | 12/2011 | Lee | H02J 3/32 307/43 |
| 2012/0043819 A1* | 2/2012 | Kang | H02J 3/32 320/128 |
| 2012/0056591 A1* | 3/2012 | Abe | H01M 10/3909 320/132 |
| 2012/0062202 A1* | 3/2012 | Min | G05F 1/67 323/299 |
| 2012/0068545 A1* | 3/2012 | Shim | H02J 7/0029 307/80 |
| 2012/0086399 A1* | 4/2012 | Choi | H02J 7/0026 320/116 |
| 2012/0086404 A1* | 4/2012 | Lim | H02J 7/0029 320/128 |
| 2012/0089261 A1* | 4/2012 | Kim | H02J 13/00016 700/286 |
| 2012/0091965 A1* | 4/2012 | Seo | H02J 7/342 320/128 |
| 2012/0094151 A1* | 4/2012 | Kim | H02J 7/0016 429/61 |
| 2012/0151240 A1* | 6/2012 | Robinson | H02J 7/00047 713/340 |
| 2012/0176088 A1* | 7/2012 | Lee | H02J 3/383 320/128 |
| 2012/0179399 A1* | 7/2012 | Yun | H04Q 9/00 702/63 |
| 2012/0183813 A1* | 7/2012 | Kim | H01M 10/425 429/7 |
| 2012/0200264 A1* | 8/2012 | Choi | H02J 3/32 320/132 |
| 2012/0249078 A1* | 10/2012 | Kim | H02J 3/32 320/128 |
| 2012/0267952 A1* | 10/2012 | Ballatine | H02J 1/16 307/26 |
| 2012/0280694 A1* | 11/2012 | Song | H04Q 9/00 324/434 |
| 2013/0049698 A1* | 2/2013 | Jung | H02J 7/007184 320/134 |
| 2013/0069429 A1* | 3/2013 | Yang | H04Q 9/00 307/23 |
| 2013/0113280 A1* | 5/2013 | Yang | H02J 7/0016 307/19 |
| 2013/0127626 A1* | 5/2013 | Yoo | G01R 31/371 340/636.19 |
| 2013/0130068 A1* | 5/2013 | Song | H01M 10/4207 429/61 |
| 2013/0141051 A1* | 6/2013 | Kang | H02J 3/32 320/134 |
| 2013/0144547 A1* | 6/2013 | Yun | G01R 31/3842 702/63 |
| 2013/0151227 A1* | 6/2013 | Yang | H02J 7/0022 703/18 |
| 2013/0154369 A1* | 6/2013 | Kim | H02J 9/062 307/26 |
| 2013/0169064 A1* | 7/2013 | Park | H02J 3/381 307/112 |
| 2013/0187611 A1* | 7/2013 | Suzuki | H02J 7/0018 320/118 |
| 2013/0207616 A1* | 8/2013 | Shim | H02J 7/0019 320/136 |
| 2013/0234671 A1* | 9/2013 | Choi | H02J 7/0016 320/128 |
| 2013/0241495 A1* | 9/2013 | Min | H02J 3/32 320/134 |
| 2013/0257383 A1* | 10/2013 | Shim | H02J 3/32 324/426 |
| 2013/0293020 A1* | 11/2013 | Shim | H02J 3/32 429/93 |
| 2013/0335028 A1* | 12/2013 | Choi | H02J 7/00304 320/126 |
| 2013/0342011 A1* | 12/2013 | Robinson | H02J 7/0027 307/12 |
| 2014/0035365 A1* | 2/2014 | Yoo | H02J 3/32 307/18 |
| 2014/0042977 A1* | 2/2014 | Kim | H02J 7/0068 320/134 |
| 2014/0077768 A1* | 3/2014 | Jung | H02J 7/0013 710/110 |
| 2014/0078632 A1* | 3/2014 | Jung | H02H 7/18 361/87 |
| 2014/0079960 A1* | 3/2014 | Yun | H01M 10/482 429/7 |
| 2014/0084689 A1* | 3/2014 | Jung | H02J 3/381 307/43 |
| 2014/0084868 A1* | 3/2014 | Yun | H02J 7/0016 320/118 |
| 2014/0087215 A1* | 3/2014 | Kim | H01M 10/625 429/50 |
| 2014/0103720 A1* | 4/2014 | Robinson | G06F 1/263 307/38 |
| 2014/0145678 A1* | 5/2014 | Hwang | H02J 7/0016 320/118 |
| 2014/0197778 A1* | 7/2014 | Kim | H02J 7/007192 320/134 |
| 2014/0210417 A1* | 7/2014 | Kim | H02J 7/04 320/136 |
| 2014/0292259 A1* | 10/2014 | Kim | H02J 7/1423 320/107 |
| 2014/0340044 A1* | 11/2014 | Kim | H02J 7/0014 320/134 |
| 2014/0347011 A1* | 11/2014 | Song | H02J 7/0016 320/134 |
| 2014/0365792 A1* | 12/2014 | Yun | H02J 7/00047 713/320 |
| 2015/0002096 A1* | 1/2015 | Suzuki | H02J 7/007 320/112 |

(56) References Cited

U.S. PATENT DOCUMENTS

| | | | |
|---|---|---|---|
| 2015/0048779 A1* | 2/2015 | Lee | H02J 7/0003 320/106 |
| 2015/0048797 A1* | 2/2015 | Song | H02J 7/0021 320/134 |
| 2015/0070024 A1* | 3/2015 | Kim | H01M 10/48 324/430 |
| 2015/0084598 A1* | 3/2015 | Song | H02J 7/0013 320/128 |
| 2015/0091529 A1* | 4/2015 | Huang | H02J 7/007 320/128 |
| 2015/0108950 A1* | 4/2015 | Yun | H02J 7/00 320/134 |
| 2015/0130277 A1* | 5/2015 | Ballantine | H02J 3/381 307/26 |
| 2015/0132615 A1* | 5/2015 | Yun | G01K 13/00 429/61 |
| 2015/0155602 A1* | 6/2015 | Hwang | H01M 10/4207 429/61 |
| 2015/0180259 A1* | 6/2015 | Yoo | H02J 7/022 320/135 |
| 2015/0188350 A1* | 7/2015 | Deboy | H02M 5/04 320/128 |
| 2015/0194707 A1* | 7/2015 | Park | H02J 7/0013 429/61 |
| 2015/0200559 A1* | 7/2015 | Im | H02J 7/022 307/18 |
| 2015/0222117 A1* | 8/2015 | Im | H02J 7/0019 307/52 |
| 2015/0255999 A1* | 9/2015 | Kim | H02J 7/007 320/134 |
| 2015/0256016 A1* | 9/2015 | Wang | H01M 10/44 320/162 |
| 2015/0263564 A1* | 9/2015 | Min | H02J 7/007194 320/128 |
| 2015/0288212 A1* | 10/2015 | Kim | H02J 7/0031 307/80 |
| 2015/0295424 A1* | 10/2015 | Suzuki | H01M 10/441 320/116 |
| 2016/0233696 A1* | 8/2016 | Mei | H02J 7/0021 |
| 2016/0241057 A1* | 8/2016 | Yang | H02J 7/007 |
| 2016/0248263 A1* | 8/2016 | Hunt | H02J 3/32 |
| 2016/0339795 A1* | 11/2016 | Fink | B60L 58/12 |
| 2017/0047759 A1* | 2/2017 | Kim | H02J 7/0068 |
| 2017/0054134 A1* | 2/2017 | Choi | G01R 31/3648 |
| 2017/0093187 A1* | 3/2017 | Park | H02J 3/32 |
| 2017/0093207 A1* | 3/2017 | Park | H02J 7/00 |
| 2017/0192474 A1* | 7/2017 | Robinson | H02J 1/00 |
| 2017/0237271 A1* | 8/2017 | Kelly-Morgan | H01G 9/00 320/166 |
| 2017/0288410 A1 | 10/2017 | Ma et al. | |
| 2017/0338525 A1* | 11/2017 | Morita | H02J 1/10 |
| 2017/0371000 A1* | 12/2017 | Fukushima | H02J 7/005 |
| 2018/0109133 A1* | 4/2018 | Wei | H02J 7/0026 |
| 2018/0115176 A1* | 4/2018 | Ye | H02J 7/007 |
| 2018/0123352 A1* | 5/2018 | Hunt | H02J 7/02 |
| 2018/0198282 A1* | 7/2018 | Hunt | H02J 7/1423 |
| 2018/0241097 A1* | 8/2018 | Yamasaki | H01M 10/48 |
| 2019/0109306 A1* | 4/2019 | Nishikawa | H02J 7/34 |
| 2019/0181659 A1* | 6/2019 | Kim | H01M 10/46 |
| 2019/0237980 A1* | 8/2019 | Yang | H01M 10/441 |
| 2019/0326752 A1* | 10/2019 | Kikuchi | H02J 3/383 |
| 2020/0006961 A1* | 1/2020 | Zhou | H02J 7/005 |
| 2020/0067315 A1* | 2/2020 | Park | H02J 3/32 |
| 2020/0076324 A1* | 3/2020 | Lee | H02J 9/062 |
| 2020/0119561 A1* | 4/2020 | Me | H02J 3/38 |
| 2020/0156476 A1* | 5/2020 | Suzuki | B60L 3/0046 |
| 2020/0195159 A1* | 6/2020 | Krzywinski | H02M 3/33584 |
| 2020/0251911 A1* | 8/2020 | Hunt | H02J 3/26 |
| 2020/0309860 A1* | 10/2020 | Arima | H01M 10/48 |
| 2021/0036514 A1* | 2/2021 | Uto | H02J 1/00 |
| 2021/0050719 A1* | 2/2021 | Cai | H02J 7/0031 |
| 2021/0050738 A1* | 2/2021 | Suzuki | H02J 7/35 |
| 2021/0066912 A1* | 3/2021 | Mitsunaga | H01M 10/486 |
| 2021/0066927 A1* | 3/2021 | Robinson | H02M 7/04 |
| 2021/0265856 A1* | 8/2021 | Nishikawa | G01R 31/3835 |

FOREIGN PATENT DOCUMENTS

| | | |
|---|---|---|
| JP | 2005-224009 | 8/2005 |
| JP | 2014-207790 | 10/2014 |
| JP | 2016-152641 | 8/2016 |
| WO | 2012/057032 | 5/2012 |
| WO | 2016/097336 A1 | 6/2016 |
| WO | 2016/170811 | 10/2016 |

OTHER PUBLICATIONS

Official Action, dated Mar. 16, 2021, in Indian Patent Application No. 202047031077.

\* cited by examiner

DIRECT CURRENT POWER SUPPLYING SYSTEM

TECHNICAL FIELD

The present invention relates to a standalone direct current (DC) power supplying system that is not connected to commercial power.

BACKGROUND ART

As one example of a DC power supplying system of this type, the DC power supplying system disclosed in Patent Literature 1 cited below is known. This DC power supplying system includes a distributed power supply (for example, a device such as a solar power generator, a wind power generator, or a fuel cell), a DC bus that connects the distributed power supply to a load, a plurality of DC power supplies (chargeable/dischargeable power supplies which include storage batteries), converters (for example, bidirectional DC/DC converters) for connecting the plurality of DC power supplies to the DC bus, and a controller for controlling the plurality of converters. In this DC power supplying system, home appliances, such as air conditioners, televisions and lighting equipment, and information devices, such as personal computers, are connected to the DC bus as loads and operate by receiving DC power (a DC voltage) from the DC bus. In this DC power supplying system, when the voltage supplied to the DC bus by the distributed power supply differs to a predetermined value, the controller performs control so that power is supplied from a DC power supply to the DC bus by at least one converter and DC power is supplied by another at least one converter from the DC bus to another DC power supply so as to keep the voltage of the DC bus at the predetermined value.

According to this DC power supplying system, even when there are large fluctuations in the DC voltage outputted from the distributed power supply to the DC bus, it is possible to stabilize the voltage (the DC voltage) of the DC bus, which makes it possible to supply a stable output voltage (the DC voltage) to a load connected to the DC bus.

CITATION LIST

Patent Literature

Patent Literature 1 PCT International Publication No. 2012/057032 (see pages 3-4 and FIG. 1)

SUMMARY OF INVENTION

Technical Problem

However, with known DC power supplying systems including the conventional DC power supplying system described above, since every converter (the bidirectional DC/DC converter) connected between the storage batteries as a plurality of DC power supplies and the DC bus is a CV type (a Constant-Voltage charging type), even when storage batteries of the same specification are used and converters of the same specification are used, there will be manufacturing errors for the storage batteries and the converters, and due to this and the difficulty in making the wiring that connects the storage batteries and the converters and the wiring that connects the converters and the DC bus exactly the same length (in other words, due to fluctuations in the resistance of the wiring), the current value of the charging/discharging current of each storage battery will not be the same. This means that when charging and discharging of the respective storage batteries is repeated, differences will occur in the remaining battery level of the respective storage batteries. Due to this, differences will also occur in the number of charging and discharging cycles for each storage battery. This results in the problem to be solved of fluctuations in the battery life of the respective storage batteries.

The present invention was conceived in view of the problem described above and has a principal object of providing a DC power supplying system capable of greatly reducing fluctuations in battery life for a plurality of storage batteries connected to a DC bus.

Solution to Problem

To achieve the stated object, a direct current (DC) power supplying system according to the present invention is a standalone DC power supplying system that comprises: a DC bus that serves as a bus line of a DC power supply; a power generator; a first converter that supplies generated power generated by the power generator to the DC bus; a second converter that performs voltage conversion on a DC voltage supplied to the DC bus and supplies to a load appliance; a plurality of storage batteries; a plurality of bidirectional converters that are each connected between each of the plurality of storage batteries and the DC bus, each bidirectionally perform voltage conversion between the DC voltage supplied to the DC bus and a DC voltage of the corresponding storage battery, and each supply a DC current from the DC bus to the storage battery and from the storage battery to the DC bus; and a controller that compares the generated power of the power generator with a load power supplied to the load appliance from the second converter, is operable when the generated power exceeds the load power, to cause the bidirectional converters to execute a charging operation that supplies the DC current to the corresponding storage batteries, and is operable when the generated power is below the load power, to cause the bidirectional converters to execute a discharging operation that supplies the DC current to the DC bus, and wherein the controller applies, when causing the bidirectional converters to execute the charging operation, a first voltage-current characteristic where the DC current increases linearly in keeping with an increase in the DC voltage supplied to the DC bus to the bidirectional converters, the first voltage-current characteristic having a slope in keeping with a remaining battery level of the corresponding storage batteries, and applies, when causing the bidirectional converters to execute the discharging operation, a second voltage-current characteristic where the DC current decreases linearly in keeping with an increase in the DC voltage supplied to the DC bus to the bidirectional converters, the second voltage-current characteristic having a slope in keeping with a remaining battery level of the corresponding storage batteries.

Specifically, the controller applies, to each bidirectional converter, the first voltage-current characteristic whose slope increases the higher the remaining battery level of the corresponding storage battery and the second voltage-current characteristic, where an absolute value of the slope decreases the higher the remaining battery level of the corresponding storage battery.

According to the present invention, during a charging operation, since a storage battery with a higher remaining battery level than other storage batteries is charged with a small charging current (or in other words, a storage battery with a lower remaining battery level than other storage batteries is charged with a large charging current), it is possible to perform charging of the storage batteries so that the remaining battery levels approach each other (that is, become uniform). On the other hand, during a discharging operation, since a storage battery with a higher remaining battery level than other storage batteries is discharged with a large charging current (or in other words, a storage battery with a lower remaining battery level than other storage batteries is discharged with a small discharging current), it is possible to perform discharging of the storage batteries so that the remaining battery levels approach each other (that is, become uniform). By doing so, according to this DC power supplying system, even when charging and discharging of the storage batteries are repeatedly executed, since it is possible to keep the remaining battery levels of the respective storage batteries in a similar state (a substantially uniform state), it is possible to avoid a situation where the number of charging and discharging cycles differs between storage batteries. As a result, it is possible to greatly reduce the occurrence of a situation where fluctuations are produced in the battery lives of individual storage batteries.

Advantageous Effects of Invention

According to the present invention, it is possible to greatly reduce fluctuations in battery life of a plurality of storage batteries that are connected to a DC bus.

DESCRIPTION OF EMBODIMENTS

Figure 1:
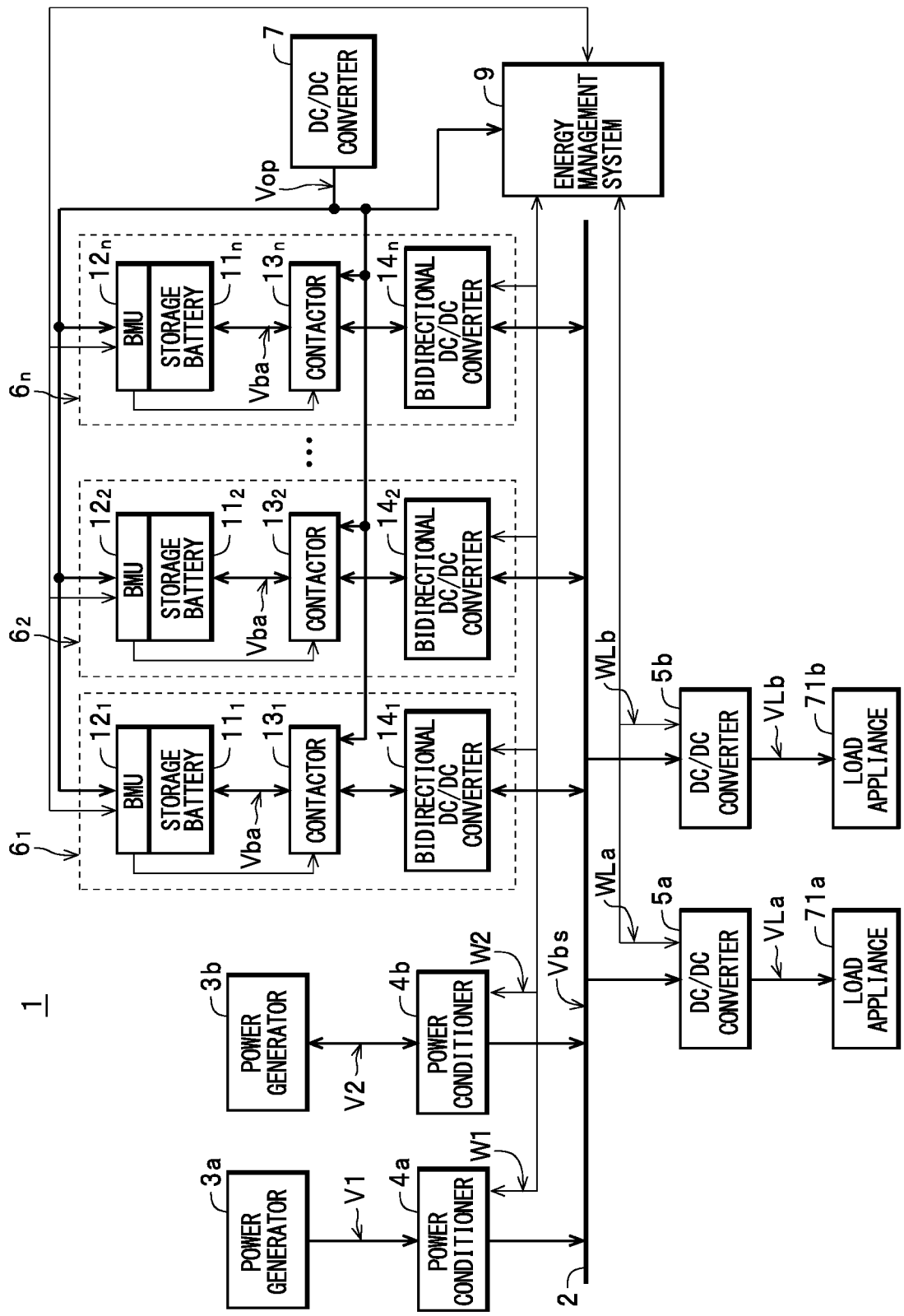
FIG. 1 is a diagram depicting the configuration of a DC power supplying system 1.

Preferred embodiments of a DC power supplying system will now be described with reference to the attached drawings. Note that the DC power supplying system according to the present invention is not limited to the embodiments described below. The component elements described below also include component elements that would be obvious to those skilled in the art and component elements that are effectively the same, with it also being possible to combine such component elements as appropriate.

First, the configuration of a DC power supplying system 1 as a DC power supplying system according to the present invention will be described.

The DC power supplying system 1 includes a DC bus 2, one or two or more power generators 3 (as one example in the present embodiment, two power generators 3a and 3b, hereinafter collectively referred to as the "power generators 3" when no distinction is made between them), first converters 4 disposed corresponding to the power generators 3 (as one example in the present embodiment, two power conditioners 4a and 4b described later), second converters 5 (as one example in the present embodiment, two second converters 5a and 5b described later, hereinafter collectively referred to as the "second converters 5" when no distinction is made between them) disposed corresponding to load appliances 71 connected to the DC power supplying system 1 (as one example in the present embodiment, two load appliances 71a and 71b, hereinafter collectively referred to as the "load appliances 71" when no distinction is made between them), a plurality of DC power supplies 6 (DC power supplies $6_1$, $6_2$, ..., $6_n$), a third converter 7, and an energy management system 9. The DC power supplying system 1 is configured as a standalone DC power supplying system that is capable of generating a DC voltage based on the power generated by the power generators 3 and supplying to the one or two or more load appliances 71 (that is, a DC power supplying system that is not connected to commercial power (that is, commercial AC power)).

The DC bus 2 is laid out along the installed locations of the power generators 3, the installed locations of the DC power supplies 6, and the installed locations of the load appliances 71, and functions as a bus line for supplying DC power. In addition, due to charging/discharging operations of bidirectional DC/DC converters 14, described later, provided inside the plurality of DC power supplies 6, the DC bus 2 is set at a bus voltage Vbs in a predetermined voltage range that includes a nominal bus voltage (as one example, in a voltage range of DC 340V to DC 400V inclusive, including DC 370V as the nominal bus voltage).

The power generators 3 are constructed of distributed power supplies. The distributed power supplies can be composed of power generators that use natural renewable energy, such as solar power generators and wind power generators, and engine-based power generators that use fossil fuel energy, such as diesel or gasoline. As one example in the present embodiment, the power generator 3a is an engine-based power generator, and in the operating state, generates and outputs an alternating current (AC) voltage V1 of a predetermined voltage value. The power generator 3b is composed of one or two or more solar power generators, for example, and automatically generates power during daytime to generate and output a DC voltage V2.

The first converter 4 is constructed of two power conditioners 4a and 4b disposed corresponding to the two power generators 3a and 3b in the present embodiment. As one example in the present embodiment, the power conditioner 4a is constructed so as to include an AC/DC converter and is disposed corresponding to the power generator 3a. The power conditioner 4a operates on a DC voltage that is internally generated based on the AC voltage V1, is controlled by the energy management system 9, converts the AC voltage V1 as the generated power outputted from the power generator 3a to the bus voltage Vbs (as one example, for the first converter 4, a voltage that is below the upper limit voltage value of the predetermined voltage range but exceeds the nominal bus voltage, that is, a voltage in the vicinity of the upper limit voltage value) and supplies the bus voltage Vbs to the DC bus 2. The power conditioner 4a also has a power measuring function that measures generated power W1 supplied from the power generator 3a to the DC bus 2 (that is, measures for a predetermined cycle T (as one example, a period of several seconds)) and outputs to the energy management system 9.

As one example, the power conditioner 4b includes a DC/DC converter and is disposed corresponding to the power generator 3b. The power conditioner 4b operates on a DC voltage that is internally generated based on the DC voltage V2, is controlled by the energy management system 9 to control the generated power by controlling power generating operations of the corresponding power generator 3b, converts the DC voltage V2 as the generated power outputted from the power generator 3b to the bus voltage Vbs, and supplies the bus voltage Vbs to the DC bus 2. The power conditioner 4b also has a power measuring function that measures generated power W2 supplied from the power generator 3b to the DC bus 2 (that is, measures for the cycle T, for example) and outputs to the energy management system 9.

As one example, the second converters 5 are constructed of DC/DC converters that operate on a DC voltage that is internally generated based on the bus voltage Vbs. In the present embodiment, for ease of understanding, it is assumed for example that the load appliances 71 (DC loads) connected to the DC power supplying system 1 are the two load appliances 71a and 71b and that the second converters 5 are composed of a second converter 5a (also referred to as the "DC/DC converter 5a") corresponding to the load appliance 71a and a second converter 5b (also referred to as the "DC/DC converter 5b") corresponding to the load appliance 71b. Here, the DC/DC converter 5a is controlled by the energy management system 9, converts the bus voltage Vbs to a load voltage VLa that is the DC voltage to be used by the load appliance 71a (DC voltage conversion) and supplies the load voltage VLa to the load appliance 71a. The DC/DC converter 5a has a current limiting function that limits the load current supplied from the DC bus 2 to the load appliance 71a to an upper limit current value set from the energy management system 9. The DC/DC converter 5a also has a power measuring function that measures load power WLa supplied from the DC bus 2 to the load appliance 71a based on the load voltage VLa and the load current (as one example, measurement in the cycle T) and outputs the load power WLa to the energy management system 9.

The DC/DC converter 5b is controlled by the energy management system 9, converts the bus voltage Vbs to a load voltage VLb that is the DC voltage to be used by the load appliance 71b (DC voltage conversion) and supplies the load voltage VLb to the load appliance 71b. The DC/DC converter 5b has a current limiting function that limits the load current supplied from the DC bus 2 to the load appliance 71b to an upper limit current value set from the energy management system 9. The DC/DC converter 5b also has a power measuring function that measures load power WLb supplied from the DC bus 2 to the load appliance 71b based on the load voltage VLb and the load current (as one example, measurement in the cycle T) and outputs the load power WLb to the energy management system 9.

Note that the load appliances 71a and 71b are DC loads that receive and operate on a supplying of the load voltages VLa and VLb that are DC voltages (hereinafter referred to as the "load voltages VL" when no distinction is made between them), and as examples, the load appliances 71a and 71b are composed of lighting equipment that operates on a DC voltage, home appliances such as televisions and refrigerators that operate on a DC voltage, and information devices, such as personal computers and mobile terminals that operate on a DC voltage.

n (where n is an integer of 2 or higher) DC power supplies $6_1, 6_2, \ldots, 6_n$ (hereinafter collectively referred to as the "DC power supplies 6" when no distinction is made between them) are disposed as the DC power supplies 6. Each DC power supply 6 includes a storage battery 11, a battery management unit (BMU) 12, a contactor 13, and a bidirectional DC/DC converter 14.

The storage batteries $11_1, 11_2, \ldots, 11_n$ (hereinafter, also referred to as the "storage batteries 11" when no particular distinction is made between them) are used to supply power to the DC bus 2, and are normally storage batteries, such as lead acid batteries or nickel hydride batteries, that are low cost and have a large capacity. The batteries are composed of storage batteries of the same type (for example, lead acid batteries of the same nominal voltage) and the same capacity (the same nominal capacity). Note that it is also possible to construct the storage batteries 11 of high-cost storage batteries, such as lithium ion batteries or NAS batteries (sodium sulfur batteries). The storage batteries 11 are configured so as to be capable of charging operations and discharging operations within a predetermined working voltage range that includes the nominal voltage.

BMUs $12_1, 12_2, \ldots, 12_n$ (hereinafter collectively referred to as the "BMUs 12" when no distinction is made between them) are disposed for the corresponding storage batteries $11_1, 11_2, \ldots, 11_n$ and operate on the operating voltage Vop, described later. In the operating state, as one example, each BMU 12 has a function that measures the charging voltage Vba of the storage battery 11, a function that calculates the SOC (State Of Charge or remaining battery level) by measuring a current value of a charging/discharging current of the storage battery 11, and a function of outputting, with a predetermined cycle T, information including the measured charging voltage Vba and/or current value of the charging/discharging current and/or the calculated SOC to the energy management system 9 as battery information. The BMU 12 also has a function which executes, when contactor control information has been inputted from the energy management system 9, a control content over the contactor 13 as indicated by the contactor control information (when the control content is a cutoff instruction, the contactor 13 is placed in the cutoff state and when the control content is a connection instruction, the contactor 13 is placed in the connection state).

The contactors $13_1, 13_2, \ldots, 13_n$ (hereinafter collectively referred to as the "contactors 13" when no distinction is made between them) are disposed between the positive electrode and the negative electrode of the corresponding storage batteries $11_1, 11_2, \ldots, 11_n$ and a pair of input/output terminals on the storage battery $11_1, 11_2, \ldots, 11_n$-sides of the corresponding bidirectional DC/DC converters $14_1, 14_2, \ldots, 14_n$ and operate on the operating voltage Vop described later. The respective contactors 13 are controlled by the corresponding BMUs 12 to enter an arbitrary state out of the cutoff state and the connection state. When in the cutoff state, the contactors 13 cut off (that is, disconnect) the positive electrode and the negative electrode from the pair of input/output terminals, and when in the connection state, the contactors 13 connect the positive electrode and the negative electrode to the pair of input/output terminals.

The bidirectional DC/DC converters $14_1, 14_2, \ldots, 14_n$ (hereinafter collectively referred to as the "bidirectional DC/DC converters 14" when no distinction is made between them) as bidirectional converters connect (that is, are disposed) between the storage batteries 11 and the DC bus 2 by each having a pair of input/output terminals on the storage battery 11 side (that is "a first pair of input/output terminals") connected via a contactor 13 to a storage battery 11 and a second pair of input/output terminals connected to the DC bus 2. As the bidirectional DC/DC converters 14, as one example it is possible to use the known bidirectional DC/DC converters disclosed in Japanese Laid-open Patent Publication No. 2016-152641.

The bidirectional DC/DC converters 14 perform a CC operation (constant current charging/discharging operation) on a DC voltage that is internally generated based on the bus voltage Vbs, and are subjected to operation control by the energy management system 9.

Figure 2:
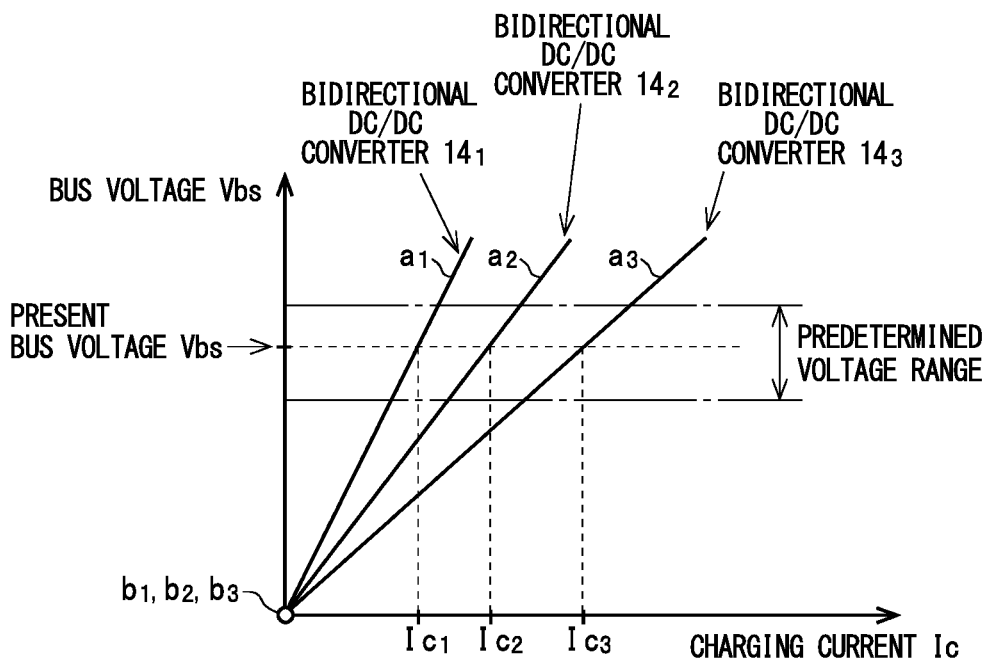
FIG. 2 is a diagram useful in explaining first voltage-current characteristics applied to respective bidirectional DC/DC converters 14 during a charging operation.

In more detail, when control information received from the energy management system 9 is a charging instruction, each bidirectional DC/DC converter 14 decides a current value of the charging current from a first voltage-current characteristic (that is, a first voltage-current characteristic applied from the energy management system 9) included in this control information and the voltage across the second pair of input/output terminals (that is, the bus voltage Vbs), steps up or steps down (that is, performs voltage conversion on) the bus voltage Vbs inputted from the second pair of input/output terminals, and outputs from the first pair of input/output terminals to the storage battery 11. By supplying the charging current to the storage battery 11 with the decided current value (hereinafter the "decided current value"), the storage battery 11 is charged (that is, a charging operation is executed with a constant current). As depicted in FIG. 2, the expression "first voltage-current characteristic" refers to a voltage-current characteristic whereby a DC current (here, the charging current) is linearly increased in keeping with an increase in the DC voltage being supplied to the DC bus 2 (that is, the bus voltage Vbs).

Figure 3:
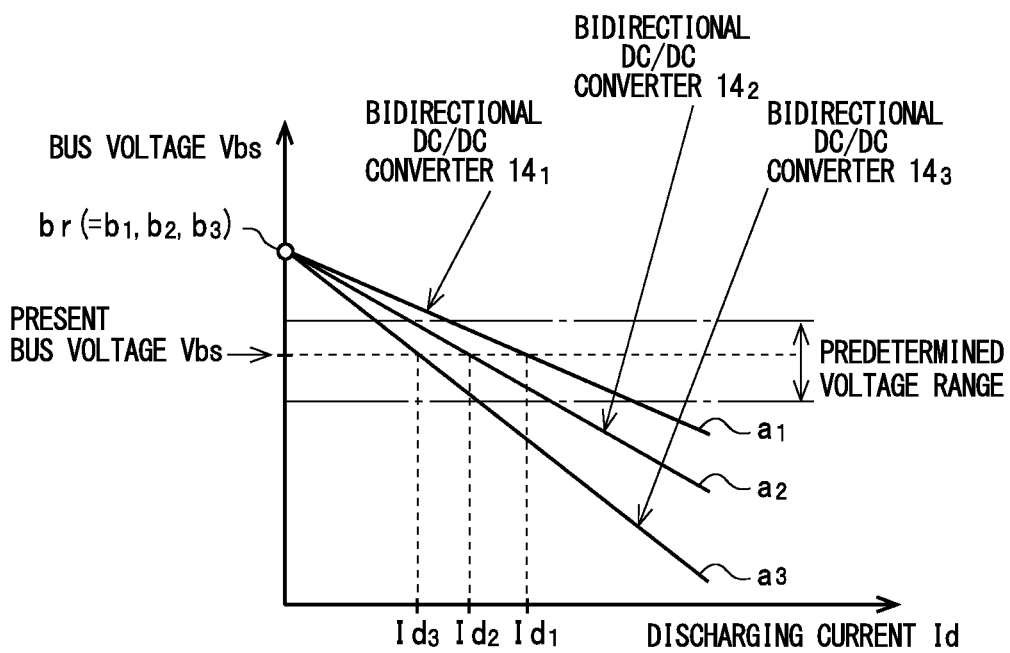
FIG. 3 is a diagram useful in explaining second voltage-current characteristics applied to respective bidirectional DC/DC converters 14 during a discharging operation.

On the other hand, when the received control information is a discharging instruction, each bidirectional DC/DC converter 14 decides a current value of the discharging current from a second voltage-current characteristic (that is, a second voltage-current characteristic applied from the energy management system 9) included in this control information and the voltage across the second pair of input/output terminals (that is, the bus voltage Vbs), steps up or steps down (that is, performs voltage conversion on) the charging voltage Vba of the storage battery 11 inputted from the first pair of input/output terminals, and outputs from the second pair of input/output terminals to the DC bus 2. By doing so, a discharging current is outputted from the storage battery 11 with the decided current value (hereinafter the "decided current value") (to discharge the storage battery 11 (that is, a discharging operation is executed with a constant current)). As depicted in FIG. 3, the expression "second voltage-current characteristic" refers to a voltage-current characteristic whereby a DC current (here, the discharging current) is linearly decreased in keeping with an increase in the DC voltage being supplied to the DC bus 2 (that is, the bus voltage Vbs).

When the control information is a stopping instruction, the bidirectional DC/DC converter 14 enters a sleep state where the operation of the bidirectional DC/DC converter 14 itself is stopped to reduce power consumption. When a bidirectional DC/DC converter 14 in the sleep state receives a charging instruction or a discharging instruction as control information, the bidirectional DC/DC converter 14 exits the sleep state and executes a charging operation or a discharging operation. Each bidirectional DC/DC converter 14 also has a current limiting function that limits the current values of the charging current supplied to the storage battery 11 and the discharging current discharged from the storage battery 11 to a maximum current value of the storage battery 11 or below.

The third converter 7 is composed of a DC/DC converter (and is hereinafter also referred to as the "DC/DC converter 7"). Although the DC/DC converter 7 operates with the bus voltage Vbs supplied from the DC bus 2 as the operating voltage as one example in the present embodiment, in place of this configuration, it is also possible to use a configuration that is provided with a dedicated power supply, not illustrated, and the DC/DC converter 7 operates on operating voltage supplied from the dedicated power supply. In the operating state, the DC/DC converter 7 steps up or steps down (that is, performs voltage conversion on) this bus voltage Vbs to generate and output the operating voltage Vop to be used by the BMU 12 and the contactor 13 of each DC power supply 6 and also the energy management system 9.

The energy management system 9 is composed of a computer that operates on the operating voltage Vop and functions as a controller. The energy management system 9 executes a charging/discharging control process for each DC power supply 6, a power generation control process over the power generators 3 (the other power generators 3 aside from the power generator 3a that is subjected to manual operation control, which in the present embodiment means the power generator 3b), and a power control process over the second converters 5. The energy management system 9 also executes a voltage measuring process that measures the bus voltage Vbs. Here, the energy management system 9 may use a configuration that directly measures the bus voltage Vbs, and as another example, it is also possible to use a configuration where a first converter 4 (that is, at least one out of the power conditioners 4a and 4b) has a function that measures the bus voltage Vbs in addition to generating power and outputs to the energy management system 9 and the energy management system 9 indirectly measures the bus voltage Vbs via the first converter 4.

Next, the operation of the DC power supplying system 1 depicted in FIG. 1 will be described. Note that for ease of understanding, it is assumed here that the charging voltage Vba of each storage battery 11 is in the working voltage range and the respective SOCs of the storage batteries 11 are not equal. It is also assumed that the respective contactors 13 are in the cutoff state at the start.

In this DC power supplying system 1, when the power generator 3a is in the operating state, the power generator 3a outputs the AC voltage V1. For this reason, the power conditioner 4a operates on being supplied with the AC voltage V1, converts the AC voltage V1 to the bus voltage Vbs, and supplies the bus voltage Vbs to the DC bus 2. The power conditioner 4a also measures the generated power W1 supplied from the power generator 3a to the DC bus 2 with the cycle T and outputs to the energy management system 9.

When the power generator 3b is in the operating state, the power generator 3b outputs the DC voltage V2. Due to this, the power conditioner 4b operates on being supplied with the DC voltage V2, converts the DC voltage V2 to the bus voltage Vbs, and supplies the bus voltage Vbs to the DC bus 2. The power conditioner 4b also measures the generated power W2 supplied from the power generator 3b to the DC bus 2 with the cycle T and outputs to the energy management system 9.

If the total generated power (W1+W2) is less than the total load power (WLa+WLb), such as when the power generator 3a and the power generator 3b are not in the operating state or when the power generator 3b is in the operating state but the generated power W2 is not sufficient (as will be described later, when the total generated power (W1+W2) is less than a reference power set in advance), the energy management system 9 causes the bidirectional DC/DC converters 14 to execute a discharging operation as described later. By discharging the storage batteries 11, the bus voltage Vbs of the DC bus 2 is kept within a predetermined voltage range including the nominal bus voltage.

In this DC power supplying system 1, during the normal state, the DC/DC converter 7 that receives the supplying of the bus voltage Vbs, which is being kept within a predetermined voltage range as described above, operates and outputs (supplies) the operating voltage Vop to the BMU 12 and the contactor 13 of each DC power supply 6 and also to the energy management system 9. This means that in the normal state, the BMU 12 and the contactor 13 of each DC power supply 6 and the energy management system 9 are placed in the operating state.

Accordingly, the BMUs $12_1$ to $12_n$ of the DC power supplies $6_1$ to $6_n$ measure the charging voltage Vba and the like of the corresponding storage batteries $11_1$ to $11_n$ with the cycle T and output to the energy management system 9 as the battery information every time measurement is performed.

While executing a voltage measuring process with the cycle T to measure the bus voltage Vbs, the energy management system 9 also executes a charging/discharging control process.

In this charging/discharging control process, the energy management system 9 calculates the total generated power (W1+W2) every time a new generated power W1 is acquired from the power conditioner 4a on the power generator 3a side and every time a new generated power W2 is acquired from the power conditioner 4b on the power generator 3b side (i.e., with the cycle T).

When the total generated power (W1+W2) is equal to or greater than the reference power set in advance, the energy management system 9 determines that it is possible to supply power to the load appliances 71 and executes control that causes the DC/DC converters 5a and 5b to convert and output the bus voltage Vbs so as to become the load voltages VLa and VLb used by the corresponding load appliances 71a and 71b. When the load voltages VLa and VLb are being outputted to the corresponding load appliances 71a and 71b, the DC/DC converters 5a and 5b also measure the load power WLa and WLb supplied to the corresponding load appliances 71a and 71b and output to the energy management system 9 with the cycle T. Every time new load power WLa and WLb are acquired, the energy management system 9 calculates the total load power (WLa+WLb).

The energy management system 9 compares the calculated total generated power (W1+W2) and the total load power (WLa+WLb) and when the total generated power (W1+W2) exceeds the total load power (WLa+WLb), determines to execute charging of the storage batteries 11 of the DC power supplies 6. When the total generated power (W1+W2) is below the total load power (WLa+WLb), the energy management system 9 determines to execute discharging from the storage batteries 11 of the DC power supplies 6.

When as a result of the total generated power (W1+W2) exceeding the total load power (WLa+WLb), the energy management system 9 has determined to execute charging of the storage batteries 11 of the DC power supplies 6, the energy management system 9 specifies the DC power supplies 6 with chargeable storage batteries 11 (that is, storage batteries 11 whose charging voltage Vba has not reached the upper limit of the working voltage range, or in other words, whose SOC (remaining battery level) has not reached 100%) based on the battery information acquired from the BMUs 12 of the respective DC power supplies 6, outputs contact control information indicating a connection instruction to the BMUs 12 of the specified DC power supplies 6, and outputs control information including a first voltage-current characteristic (see FIG. 2) and a charging instruction to the bidirectional DC/DC converters 14 of these DC power supplies 6. That is, the energy management system 9 executes a charging operation that charges the storage batteries 11 of the DC power supplies 6 with the power difference (or power surplus) between the total generated power (W1+W2) and the total load power (WLa+WLb). By dividing the power difference in this cycle T by the bus voltage Vbs measured in this cycle T, the energy management system 9 calculates the total surplus current (that is, the total amount of the charging currents) that can be used to charge the storage batteries 11 in this cycle T.

The process for deciding the first voltage-current characteristic for a bidirectional DC/DC converter 14 (a voltage-current characteristic whereby the charging current (hereinafter also referred to as the "charging current Ic") is linearly increased in keeping with an increase in the bus voltage Vbs) will now be described. Note that for ease of understanding, it is assumed here that the specified bidirectional DC/DC converters 14 are the three bidirectional DC/DC converters $14_1$ to $14_3$ for example, and at the start of the cycle T, $SOC_1$ to $SOC_3$ for these bidirectional DC/DC converters $14_1$ to $14_3$ are such that $SOC_1 > SOC_2 > SOC_3$ for example (each of these remaining battery levels is less than 100%).

Since the first voltage-current characteristic is a voltage-current characteristic whereby the bus voltage Vbs is linearly increased in keeping with increases in the charging current Ic, in this deciding process, the energy management system 9 first sets the first voltage-current characteristic of the bidirectional DC/DC converter $14_1$ at a voltage-current characteristic expressed by the linear function "Vbs=$a_1 \times$Ic+$b_1$", sets the first voltage-current characteristic of the bidirectional DC/DC converter $14_2$ at a voltage-current characteristic expressed by the linear function "Vbs=$a_2 \times$Ic+$b_2$", and sets the first voltage-current characteristic of the bidirectional DC/DC converter $14_3$ at a voltage-current characteristic expressed by the linear function "Vbs=$a_3 \times$Ic+$b_3$". The intercepts $b_1$, $b_2$, and $b_3$ as the intercepts of the linear functions indicating the respective first voltage-current characteristics are the same, and for ease of understanding, $b_1$, $b_2$, and $b_3$ are assumed to be zero in the present embodiment. Accordingly, the first voltage-current characteristics of the bidirectional DC/DC converters $14_1$, $14_2$, and $14_3$ are respectively expressed as Vbs=$a_1 \times$Ic, Vbs=$a_2 \times$Ic, and Vbs=$a_3 \times$Ic.

Next, based on the calculated total amount of the charging current that can be used to charge the storage batteries 11 and $SOC_1$ to $SOC_3$ of the respective storage batteries $11_1$, $11_2$, and $11_3$, the energy management system 9 decides the slopes $a_1$, $a_2$, and $a_3$ (for a charging operation, positive coefficients) as the slopes of the linear functions that indicate the first voltage-current characteristics of the corresponding bidirectional DC/DC converters $14_1$, $14_2$, and $14_3$.

In more detail, the energy management system 9 decides the slopes $a_1$, $a_2$, and $a_3$ so that the charging current Ic for a storage battery 11 whose SOC is higher than the SOCs of the other storage batteries 11 is smaller than the charging currents Ic for the other storage batteries 11, or in other words, so that the charging current Ic for a storage battery 11 whose SOC is lower than the SOCs of the other storage batteries 11 is larger than the charging currents Ic for the other storage batteries 11 to make the $SOC_1$ to $SOC_3$ of the respective storage batteries $11_1$, $11_2$, and $11_3$ approach each other (that is, become uniform) through the charging of the storage batteries $11_1$, $11_2$, and $11_3$. In this specific example, since the SOCs of the storage batteries $11_1$, $11_2$, and $11_3$ are in a relationship where $SOC_1 > SOC_2 > SOC_3$, as depicted in FIG. 2, the energy management system 9 decides the slopes $a_1$, $a_2$, and $a_3$ so that the charging currents $Ic_1$, $Ic_2$, and $Ic_3$ for the storage batteries $11_1$, $11_2$, and $11_3$ at the present bus voltage Vbs (which is the same for all the storage batteries 11) are in a relationship where $Ic_3 > Ic_2 > Ic_1$ and the sum of the charging currents $Ic_1$, $Ic_2$, and $Ic_3$ matches the total amount of the charging current described above that can be used to charge the storage batteries 11. To describe the relationship between the slopes $a_1$ to $a_3$ and $SOC_1$ to $SOC_3$ in more detail, the energy management system 9 decides the slopes a so that the slopes $a_1$ to $a_3$ are values in keeping with $SOC_1$ to $SOC_3$, that is, so that the higher the SOC of the corresponding storage battery 11, the slope a of the first voltage-current characteristic applied to the respective bidirectional DC/DC converters 14 increases (in this example, since $SOC_1 > SOC_2 > SOC_3$, so that $a_1 > a_2 > a_3$).

Accordingly, the bidirectional DC/DC converters $14_1$, $14_2$, and $14_3$ to which the first voltage-current characteristics indicated by the linear functions ($Vbs=a_1 \times Ic$, $Vbs=a_2 \times Ic$, $Vbs=a_3 \times Ic$) decided in this way have been respectively applied execute charging of the corresponding storage batteries $11_1$, $11_2$, and $11_3$ in the cycle T with the charging currents $Ic_1$, $Ic_2$, and $Ic_3$ (where $Ic_3 > Ic_2 > Ic_1$) of magnitudes decided by the applied first voltage-current characteristics and the present bus voltage Vbs. As a result, in the cycle T, the storage battery $11_1$ with a high $SOC_1$ is charged with the small charging current $Ic_1$, the storage battery $11_2$ whose $SOC_2$ is lower than the $SOC_1$ is charged with the charging current $Ic_2$ that is larger than the charging current $Ic_1$, and the storage battery $11_3$ whose $SOC_3$ is lower than the $SOC_2$ is charged with the charging current $Ic_3$ that is larger than the charging current $Ic_2$. That is, the storage batteries $11_1$, $11_2$, and $11_3$ are charged so that $SOC_1$ to $SOC_3$ approach each other (that is, become uniform).

Since the bidirectional DC/DC converters $14_1$, $14_2$, and $14_3$ are respectively applied with the first voltage-current characteristics indicated by these linear functions ($Vbs=a_1 \times Ic$, $Vbs=a_2 \times Ic$, $Vbs=a_3 \times Ic$), when the bus voltage Vbs has risen from the present bus voltage Vbs, the respective charging currents $Ic_1$, $Ic_2$, and $Ic_3$ are increased in keeping with the first voltage-current characteristics to suppress the extent of the rise in the bus voltage Vbs, and on the other hand, when the bus voltage Vbs has fallen from the present bus voltage Vbs, the respective charging currents $Ic_1$, $Ic_2$, and $Ic_3$ are decreased in keeping with the first voltage-current characteristics to suppress the extent of the fall in the bus voltage Vbs. That is, due to the bidirectional DC/DC converters $14_1$, $14_2$, and $14_3$ executing charging operations based on the applied first voltage-current characteristics, fluctuations in the bus voltage Vbs are suppressed (that is, the bus voltage Vbs is stabilized), and the bus voltage Vbs is kept within the predetermined voltage range.

On the other hand, when as a result of the total generated power (W1+W2) falling below the total load power (WLa+WLb), the energy management system 9 has determined to execute discharging of the storage batteries 11 of the DC power supplies 6, the energy management system 9 specifies the DC power supplies 6 with dischargeable storage batteries 11 (that is, storage batteries 11 whose charging voltage Vba has not reached the lower limit of the working voltage range) based on the battery information acquired from the BMUs 12 of the respective DC power supplies 6, outputs contact control information indicating a connection instruction to the BMUs 12 of the specified DC power supplies 6, and outputs control information including a second voltage-current characteristic (see FIG. 3) and a discharging instruction to the bidirectional DC/DC converters 14 of these DC power supplies 6. That is, the energy management system 9 executes a discharging operation that has the storage batteries 11 of the DC power supplies 6 discharged with the power difference (or power insufficiency) between the total generated power (W1+W2) and the total load power (WLa+WLb). By dividing the power difference in this cycle T by the bus voltage Vbs measured in this cycle T, the energy management system 9 calculates the total current insufficiency (that is, the total amount of the discharging currents to be discharged from the storage batteries 11) for this cycle T.

The process for deciding the second voltage-current characteristic for a bidirectional DC/DC converter 14 (a voltage-current characteristic whereby the discharging current (hereinafter also referred to as the "discharging current Id") is linearly decreased in keeping with an increase in the bus voltage Vbs) will now be described. Note that for ease of understanding, it is assumed here that the specified bidirectional DC/DC converters 14 are the three bidirectional DC/DC converters $14_1$ to $14_3$ for example, and at the start of the cycle T, $SOC_1$ to $SOC_3$ for these bidirectional DC/DC converters $14_1$ to $14_3$ are such that $SOC_1 > SOC_2 > SOC_3$ for example (each of these remaining battery levels is less than 100%).

Since the second voltage-current characteristic is a voltage-current characteristic whereby the bus voltage Vbs is linearly decreased in keeping with increases in the discharging current Id, in this deciding process, the energy management system 9 first sets the second voltage-current characteristic of the bidirectional DC/DC converter $14_1$ at a voltage-current characteristic expressed by the linear function "$Vbs=a_1 \times Id+b_1$", sets the second voltage-current characteristic of the bidirectional DC/DC converter $14_2$ at a voltage-current characteristic expressed by the linear function "$Vbs=a_2 \times Id+b_2$", and sets the second voltage-current characteristic of the bidirectional DC/DC converter $14_3$ at a voltage-current characteristic expressed by the linear function "$Vbs=a_3 \times Id+b_3$". The intercepts $b_1$, $b_2$, and $b_3$ as the intercepts of the linear functions indicating the respective second voltage-current characteristics are the same, and are set at a voltage br (or the "reference voltage") set in advance that is equal to or greater than the upper limit of the predetermined voltage range that includes the nominal bus voltage. Accordingly, the second voltage-current characteristics of the bidirectional DC/DC converters $14_1$, $14_2$, and $14_3$ are respectively expressed as $Vbs=a_1 \times Id+br$, $Vbs=a_2 \times Id+br$, and $Vbs=a_3 \times Id+br$.

Next, based on the calculated total amount of the discharging current that can be discharged from the storage batteries 11 and $SOC_1$ to $SOC_3$ of the respective storage batteries $11_1$, $11_2$, and $11_3$, the energy management system 9 decides the slopes $a_1$, $a_2$, and $a_3$ (for a discharging operation, negative coefficients) as the slopes of the linear functions that indicate the second voltage-current characteristics of the corresponding bidirectional DC/DC converters $14_1$, $14_2$, and $14_3$.

In more detail, the energy management system 9 decides the slopes $a_1$, $a_2$, and $a_3$ so that the discharging current Id from a storage battery 11 whose SOC is higher than the SOCs of the other storage batteries 11 is larger than the discharging currents Id from the other storage batteries 11, or in other words, so that the discharging current Id from a storage battery 11 whose SOC is lower than the SOCs of the other storage batteries 11 is smaller than the discharging currents Id from the other storage batteries 11 to make the $SOC_1$ to $SOC_3$ of the respective storage batteries $11_1$, $11_2$, and $11_3$ approach each other (that is, become uniform) through the discharging of the storage batteries $11_1$, $11_2$, and $11_3$. In this specific example, since the SOCs of the storage batteries $11_1$, $11_2$, and $11_3$ are in a relationship where $SOC_1 > SOC_2 > SOC_3$, as depicted in FIG. 3, the energy management system 9 decides the slopes $a_1$, $a_2$, and $a_3$ so that the discharging currents $Id_1$, $Id_2$, and $Id_3$ from the storage batteries $11_1$, $11_2$, and $11_3$ at the present bus voltage Vbs (which is the same for all the storage batteries 11) are in a relationship where $Id_1 > Id_2 > Id_3$ and the sum of the discharging currents $Id_1$, $Id_2$, and $Id_3$ matches the total amount of the discharging current described above that can be discharged from the storage batteries 11. To describe the relationship between the slopes $a_1$ to $a_3$ and $SOC_1$ to $SOC_3$ in more detail, the energy management system 9 decides the slopes a so that the slopes $a_1$ to $a_3$ are values in keeping with $SOC_1$ to $SOC_3$, that is, so that the higher the SOC of the corresponding storage battery 11, the smaller the absolute value of the slope a of the second voltage-current characteristic applied to the respective bidirectional DC/DC converters 14 (in this example, since $SOC_1 > SOC_2 > SOC_3$ and the slopes a are negative, so that the absolute values of the slopes a are $|a_1| < |a_2| < |a_3|$).

Accordingly, the bidirectional DC/DC converters $14_1$, $14_2$, and $14_3$ to which the second voltage-current characteristics indicated by the linear functions ($Vbs = a_1 \times Id + br$, $Vbs = a_2 \times Id + br$, $Vbs = a_3 \times Id + br$) decided in this way have been respectively applied execute discharging from the corresponding storage batteries $11_1$, $11_2$, and $11_3$ in the cycle T with the discharging currents $Id_1$, $Id_2$, and $Id_3$ (where $Id_1 > Id_2 > Id_3$) of magnitudes decided by the applied second voltage-current characteristics and the present bus voltage Vbs. As a result, in the cycle T, the storage battery $11_1$ with a high $SOC_1$ is discharged with the large discharging current $Id_1$, the storage battery $11_2$ whose $SOC_2$ is lower than the $SOC_1$ is discharged with the discharging current $Id_2$ that is smaller than the discharging current $Id_1$, and the storage battery $11_3$ whose $SOC_3$ is lower than the $SOC_2$ is discharged with the discharging current $Id_3$ that is smaller than the discharging current $Id_2$. That is, the storage batteries $11_1$, $11_2$, and $11_3$ are discharged so that $SOC_1$ to $SOC_3$ approach each other (that is, become uniform).

Since the bidirectional DC/DC converters $14_1$, $14_2$, and $14_3$ are respectively applied with the second voltage-current characteristics indicated by these linear functions ($Vbs = a_1 \times Id + br$, $Vbs = a_2 \times Id + br$, $Vbs = a_3 \times Id + br$), when the bus voltage Vbs has risen from the present bus voltage Vbs, the respective discharging currents $Id_1$, $Id_2$, and $Id_3$ are decreased in keeping with the second voltage-current characteristics to suppress the extent of the rise in the bus voltage Vbs, and on the other hand, when the bus voltage Vbs has fallen from the present bus voltage Vbs, the respective discharging currents $Id_1$, $Id_2$, and $Id_3$ are increased in keeping with the second voltage-current characteristics to suppress the extent of the fall in the bus voltage Vbs. That is, due to the bidirectional DC/DC converters $14_1$, $14_2$, and $14_3$ executing discharging operations based on the applied second voltage-current characteristics, fluctuations in the bus voltage Vbs are suppressed (that is, the bus voltage Vbs is stabilized), and the bus voltage Vbs is kept within the predetermined voltage range.

In this way, according to this DC power supplying system 1, the energy management system 9 determines whether to cause the bidirectional DC/DC converters 14 to execute a charging operation or a discharging operation based on the power difference between the total generated power (W1+W2) and the total load power (WLa+WLb) with a cycle T. When a charging operation is to be executed, the energy management system 9 applies the first voltage-current characteristics (see FIG. 2) whereby the charging current Ic linearly increases in keeping with an increase in the bus voltage Vbs to the bidirectional DC/DC converters 14 with slopes (as examples, $a_1$ to $a_3$ depicted in FIG. 2) in keeping with the SOCs (the remaining battery levels) of the corresponding storage batteries 11. When a discharging operation is to be executed, the energy management system 9 applies the second voltage-current characteristics (see FIG. 3) whereby the discharging current Id linearly decreases in keeping with an increase in the bus voltage Vbs to the bidirectional DC/DC converters 14 with slopes (as examples, $a_1$ to $a_3$ depicted in FIG. 3) in keeping with the SOCs (the remaining battery levels) of the corresponding storage batteries 11.

This means that according to this DC power supplying system 1, during a charging operation, since a storage battery 11 with a higher SOC than other storage batteries 11 is charged with a small charging current Ic (or in other words, a storage battery 11 whose SOC is lower than other storage batteries 11 is charged with a large charging current Ic), it is possible to charge the storage batteries 11 so that their SOCs approach one another (that is, become uniform). On the other hand, during a discharging operation, since a storage battery 11 with a higher SOC than other storage batteries 11 is discharged with a large discharging current Id (or in other words, a storage battery 11 whose SOC is lower than other storage batteries 11 is discharged with a small discharging current Id), it is possible to discharge the storage batteries 11 so that their SOCs approach one another (that is, become uniform). By doing so, with the DC power supplying system 1, when charging and discharging of the storage batteries 11 are repeatedly executed, it is possible to maintain a state where the remaining battery levels of the storage batteries 11 are similar (a substantially uniform state), and since it is possible to avoid a situation where the number of charging and discharging cycles differs between storage batteries, it is possible to greatly reduce the occurrence of a situation where fluctuations are produced in the battery lives of the individual storage batteries 11.

Figure 4:
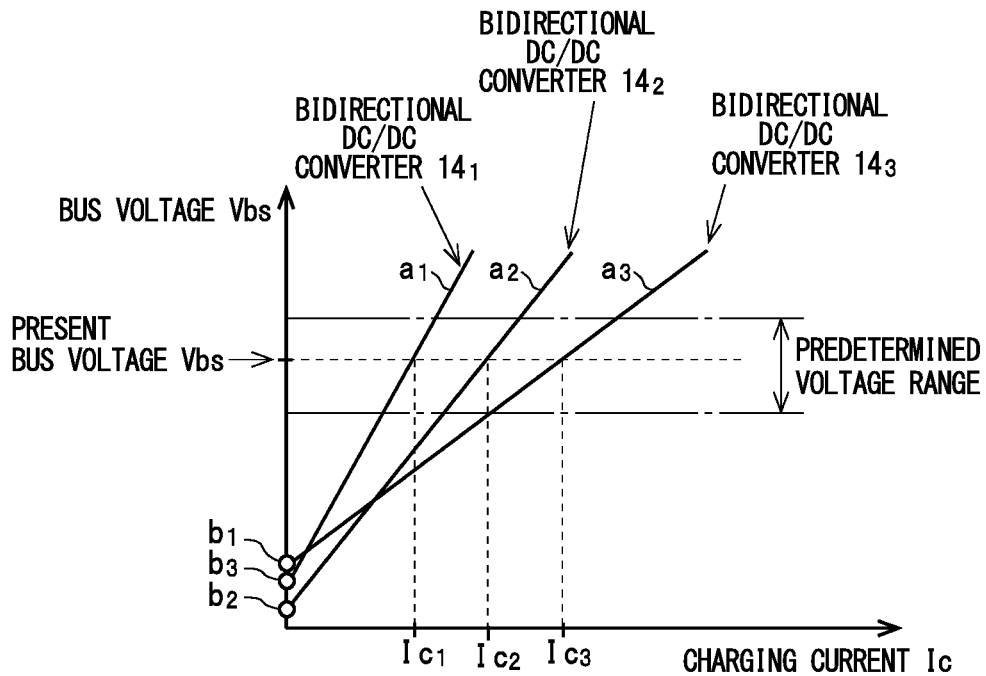
FIG. 4 is a diagram useful in explaining other first voltage-current characteristics applied to respective bidirectional DC/DC converters 14.

Also, although for ease of understanding, the intercepts $b_1$, $b_2$, and $b_3$ of the linear functions indicating the first voltage-current characteristics applied when the bidirectional DC/DC converters 14 are to execute a charging operation are set so as to be the same and at zero as depicted in FIG. 2, the present invention is not limited to this. As one example, as depicted in FIG. 4, it is also possible to use a configuration where at least one value differs to the other values and at least one value is non-zero (as one example in FIG. 4, all of the values differ and are non-zero). Even when the intercepts $b_1$, $b_2$, and $b_3$ are configured as depicted in FIG. 4, in the same way as the configuration in FIG. 2, it is sufficient, by deciding the slopes $a_1$ to $a_3$ of the linear functions indicating the first voltage-current characteristics applied to the bidirectional DC/DC converters $14_1$, $14_2$, and $14_3$ so as to have a relationship $a_1 > a_2 > a_3$ corresponding to the relationship $SOC_1 > SOC_2 > SOC_3$ of the SOCs of the respective storage batteries 11, for the charging current $Ic_1$ at the bidirectional DC/DC converter $14_1$ corresponding to the storage battery $11_1$ with the highest $SOC_1$ to be the smallest, the charging current $Ic_2$ at the bidirectional DC/DC converter $14_2$ corresponding to the storage battery $11_2$ with the next highest $SOC_2$ to be the next smallest, and the charging current $Ic_2$ at the bidirectional DC/DC converter $14_3$ corresponding to the storage battery $11_3$ with the lowest $SOC_3$ to be the largest, regardless of the value the bus voltage Vbs takes in the predetermined voltage range that includes the nominal bus voltage.

Figure 5:
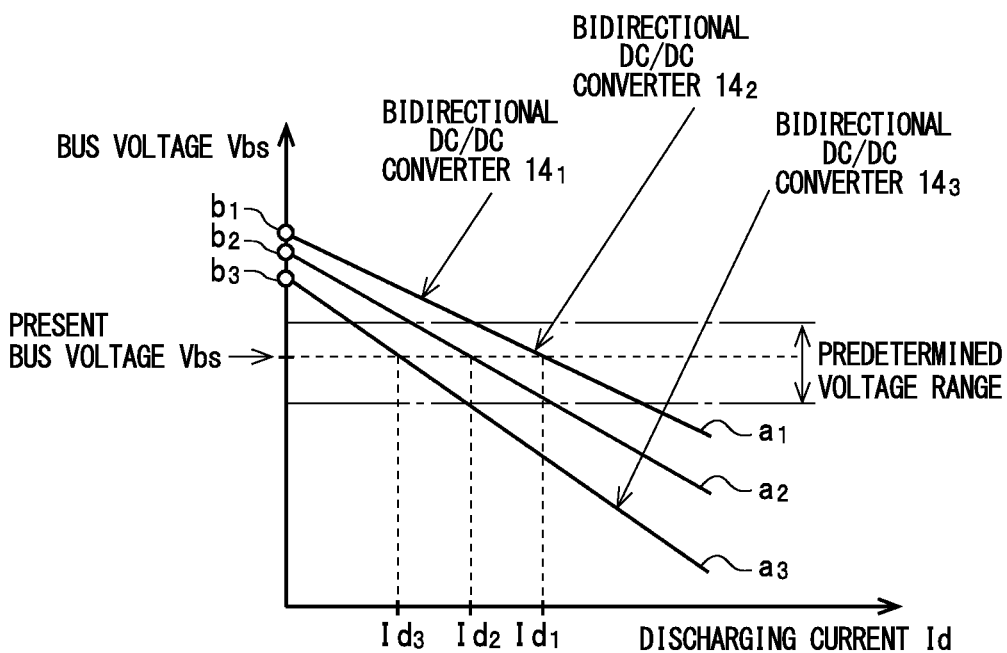
FIG. 5 is a diagram useful in explaining other second voltage-current characteristics applied to respective bidirectional DC/DC converters 14.

Also, although for ease of understanding, the intercepts $b_1$, $b_2$, and $b_3$ of the linear functions indicating the second voltage-current characteristics applied when the bidirectional DC/DC converters 14 are to execute a discharging operation are set so as to be the same as depicted in FIG. 3, the present invention is not limited to this. As one example, as depicted in FIG. 5, it is also possible to use a configuration where at least one value differs to the other values (as one example in FIG. 5, all of the values are different). Even when the intercepts $b_1$, $b_2$, and $b_3$ are configured as depicted in FIG. 5, in the same way as the configuration in FIG. 3, it is sufficient, by deciding the slopes $a_1$ to $a_3$ of the linear functions indicating the second voltage-current characteristics applied to the bidirectional DC/DC converters $14_1$, $14_2$, and $14_3$ so as to have a relationship $|a_3|>|a_2|>|a_1|$ corresponding to the relationship $SOC_1>SOC_2>SOC_3$ of the SOCs of the respective storage batteries 11, for the discharging current $Id_1$ at the bidirectional DC/DC converter $14_1$ corresponding to the storage battery $11_1$ with the highest $SOC_1$ to be the largest, the discharging current $Id_2$ at the bidirectional DC/DC converter $14_2$ corresponding to the storage battery $11_2$ with the next highest $SOC_2$ to be the next largest, and the discharging current $Id_3$ at the bidirectional DC/DC converter $14_3$ corresponding to the storage battery $11_3$ with the lowest $SOC_3$ to be the smallest, regardless of the value the bus voltage Vbs takes in the predetermined voltage range that includes the nominal bus voltage.

INDUSTRIAL APPLICABILITY

According to the present invention, since it is possible to greatly reduce fluctuations in battery life due to differences being produced in the number of charging and discharging cycles between the storage batteries, the present invention can be widely applied in standalone DC power supplying systems that require storage batteries.

REFERENCE SIGNS LIST

1 DC power supplying system
2 DC bus
3a, 3b Power generator
4a, 4b First converter
5a, 5b Second converter
9 Energy management system
$11_2$ to $11_n$ Storage battery
$14_2$ to $14_n$ Bidirectional DC/DC converter
71a, 71b Load appliance
Vbs Bus voltage
W1, W2 Generated power
W1a, W1b Load power

The invention claimed is:

1. A standalone direct current (DC) power supplying system, comprising:
a DC bus that is configured to serve as a bus line of a DC power supply;
a power generator;
a first converter that is configured to supply generated power generated by the power generator to the DC bus;
a second converter that is configured to perform voltage conversion on a bus voltage of the DC bus and to supply a load appliance;
a plurality of storage batteries;
a plurality of bidirectional converters that are each connected between each of the plurality of storage batteries and the DC bus, each configured to bidirectionally perform voltage conversion between the bus voltage and a battery voltage of the corresponding storage battery, and each configured to supply a DC current to the storage battery or to the DC bus; and
a controller that is configured to compare the generated power of the power generator with a load power supplied to the load appliance from the second converter,
is operable when the generated power exceeds the load power, to cause the bidirectional converters to execute a charging operation that supplies a constant charging current to the corresponding storage batteries, and
is operable when the generated power is below the load power, to cause the bidirectional converters to execute a discharging operation that supplies a constant discharging current to the DC bus, and
wherein the controller is configured to
apply, when causing the bidirectional converters to execute the charging operation, a first voltage-current characteristic where a current value of the constant charging current increases linearly in keeping with an increase in the bus voltage to the bidirectional converters, the first voltage-current characteristic having a slope in keeping with a remaining battery level of the corresponding storage batteries, and
apply, when causing the bidirectional converters to execute the discharging operation, a second voltage-current characteristic where a current value of the constant discharging current decreases linearly in keeping with an increase in the bus voltage to the bidirectional converters, the second voltage-current characteristic having a slope in keeping with a remaining battery level of the corresponding storage batteries.

2. The DC power supplying system according to claim 1, wherein the controller is configured to apply, to each bidirectional converter,
the first voltage-current characteristic whose slope increases the higher the remaining battery level of the corresponding storage battery, and
the second voltage-current characteristic, where an absolute value of the slope decreases the higher the remaining battery level of the corresponding storage battery.

* * * * *